United States Patent Office 2,694,191
Patented Nov. 9, 1954

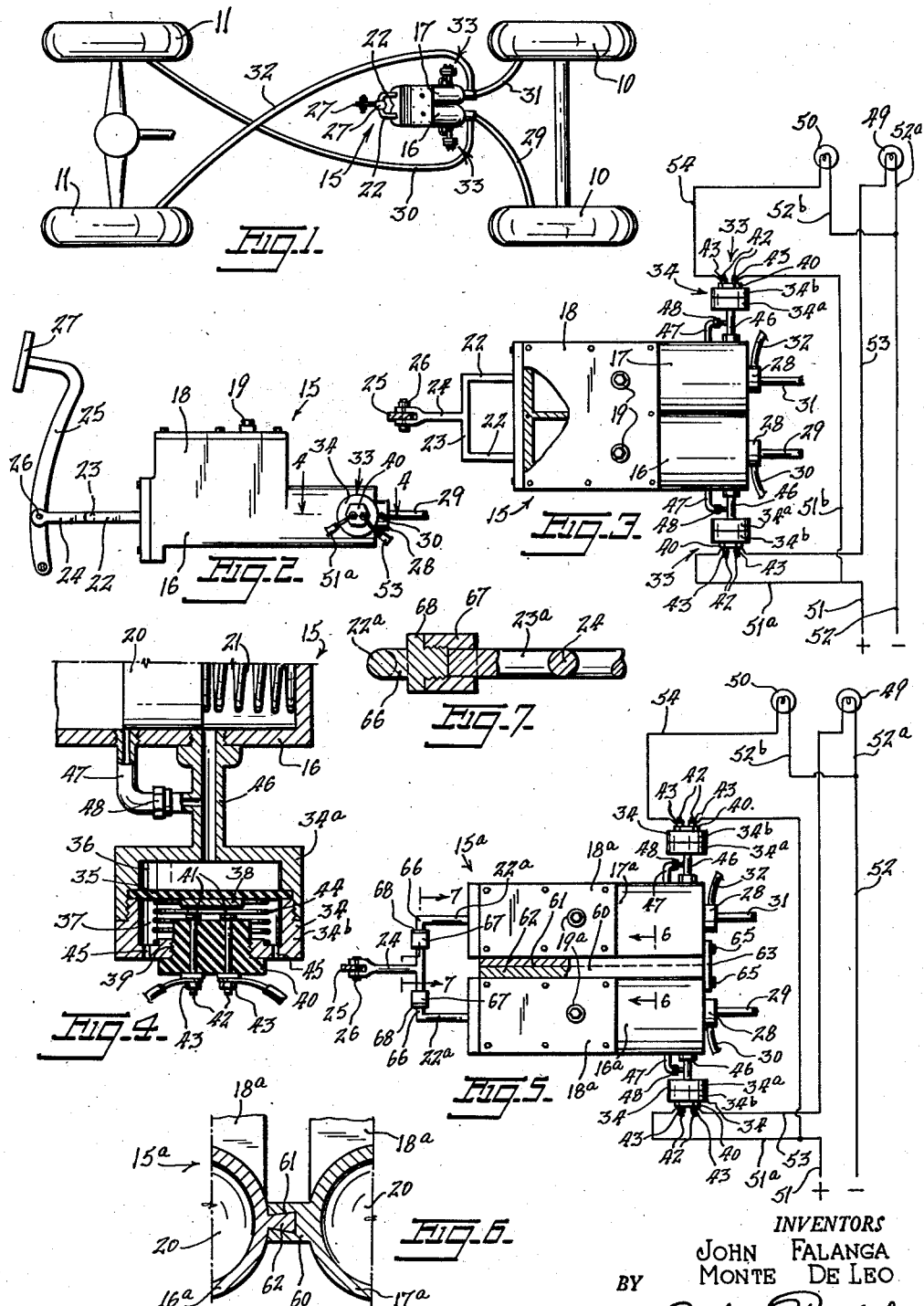

2,694,191

DOUBLE BARREL MASTER CYLINDER BRAKE SYSTEM

John Falanga and Monte De Leo, Brooklyn, N. Y.

Application February 27, 1952, Serial No. 273,718

1 Claim. (Cl. 340—69)

The present invention proposes certain improvements in hydraulic brake systems and, more particularly, proposes new and useful improvements in an operating assembly for the wheel brakes of a motor vehicle.

In conventional hydraulic brakes used on present day motor vehicles and employing a non-compressible liquid or brake fluid for causing the wheel brakes to be applied in response to foot pressure on a pedal within convenient reach of the operator of the vehicle, it is common practice to employ only a single master cylinder as the source of fluid under pressure for all of the brakes. Such arrangement has proven objectionable because a leak at any single point in the system results in a loss of pressure in each of the wheel brakes. Therefore, a minor leak at any point in the system will find the operator without brakes and at the complete mercy of the vehicle's inertia until forward momentum has expended itself or the forward progress of the vehicle is stopped by hitting some solid object.

The present invention has as its primary object the provision of a master cylinder unit for the hydraulic brake system of present day motor vehicles having a pair of separate cylinders interconnected to function in unison with each cylinder connected to the brakes of two wheels of the vehicle in a manner to provide two separate braking systems for the vehicle so that leakage in one system leaves the other system free to operate normally so that the vehicle will have at least partial braking at all times.

Still further, the present invention proposes separate hose connections from each of the cylinders of the master cylinder unit to each of two different brakes of the vehicle—one located at the front on one side and the other located at the rear on the other side—so each brake system will be capable of applying an equal braking force to the two sides of the vehicle when only one brake system is working to retain the vehicle from side slipping or being thrown into a skid.

As a further object the present invention proposes a separate signal system operating in conjunction with each of the cylinders of the master cylinder unit for operating signal lamps within convenient view of the operator of the vehicle for indicating when one of the cylinders is not functioning for applying its respective brakes.

It is a further object of the present invention to provide an improved operating assembly for the wheel brakes of a motor vehicle which is simple and durable, which is effective for its intended purposes and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

On the accompanying drawing forming a material part of the present disclosure:

Fig. 1 is a diagrammatic view illustrating the operating assembly for the wheel brakes of a motor vehicle in accordance with the present invention as it appears in plan when mounted on a vehicle.

Fig. 2 is an enlarged side elevational view of the master cylinder unit, per se.

Fig. 3 is a plan view of Fig. 2 with a schematic wiring diagram of the signal mechanism applied thereto.

Fig. 4 is an enlarged partial longitudinal sectional view taken on the line 4—4 of Fig. 2.

Fig. 5 is a view similar to Fig. 3, but illustrating a modification of the present invention and with a portion thereof shown in section.

Fig. 6 is an enlarged partial transverse vertical sectional view taken on the line 6—6 of Fig. 5.

Fig. 7 is an enlarged partial transverse vertical sectional view taken on the line 7—7 of Fig. 5.

The brake system, according to the first form of the present invention illustrated in Figs. 1 to 4, is shown applied to a motor vehicle, diagrammatically illustrated in plan in Fig. 1, having the usual front wheels 10 and rear wheels 11. The brake system is constructed to include a master cylinder unit 15 having a pair of adjacent cylinders 16 and 17. Mounted over the cylinders 16 and 17 there is a composite reservoir 18 having separate compartments for containing brake fluid in reserve for each of the cylinders. The separate compartments of the reservoir 18 can be best seen in Fig. 3. The supply of fluid within each of the compartments of the reservoir 18 can be renewed through separate fill openings in the top thereof closed by removable screw plugs 19, as generally known in the art.

Slidably mounted for axial movement within each of the cylinders of the master brake unit 15, there is a piston 20, see Fig. 4. The pistons are urged rearward within the cylinders 16 and 17, to an inoperative position, by the usual springs 21.

Pedal means is provided for moving the pistons 20 in unison against the action of the springs 21 to force brake fluid from the front ends of the cylinders 16 and 17 to operate the brakes of the vehicle wheels 10 and 11 as will become clear as this specification proceeds. The pedal means includes a piston rod 22 extended coaxially from the rear face of each of the pistons 20 with their rear ends slidably extended from the rear ends of the cylinders 16 and 17. The projected rear ends of the piston rods 22 are joined by an integral cross bar 23 from which an extension 24 extends. The extension projects from the cross bar 23 intermediate of its ends and parallel to the length of the piston rods 22. The rear end of the extension 24 is pivotally joined to the usual pedal lever 25 by a pivot pin 26. The bottom end of the pedal lever 25, as is generally known in the art, is pivoted to a fixed part of the vehicle's chassis and has its top extended projected upward through a slot in the floor boards of the vehicle and provided with the usual pedal 27 to be engaged by the operator's right foot. When the pedal 27 is moved the pistons 20 will be moved in unison within the cylinders 16 and 17 and against the action of the springs 21 to force the brake fluid from the cylinders with equal pressure.

Mounted on the front end of each of the cylinders 16 and 17, there is a hose connector 28. Extending from the hose connector 28 of the cylinder 16 there is a pair of hoses 29 and 30. The free end of the hose 29 is connected to the brake of the front wheel 10 at one side of the vehicle and the hose 30 is connected to the brake of the rear wheel 11 at the other side of the vehicle. Extending from the hose connector 28 of the cylinder 17, there is a pair of hoses 31 and 32.

The hose 31 is connected to the other front wheel 10 at the same side of the vehicle as the rear wheel to which the hose 30 is connected. The hose 32 is connected to the other rear wheel 11 at the other side of the vehicle from the front wheel 10 to which the hose 31 is connected. The arrangement of the hoses 29 and 30 and 31 and 32 can be best seen from Fig. 1, from which it will be noted that each cylinder 16 or 17 operates the brake of a front wheel at one side of the vehicle and a rear wheel at the other side of the vehicle. Thus, it is apparent that the present invention provides two separate brake systems each operating two wheel brakes of the vehicle. When any one of the brake systems is not functioning, the vehicle is left with partial braking permitting the vehicle to be safety stopped until emergency repairs can be made to restore the four wheel brakes. By having each cylinder operate a front and rear wheel on opposite sides of the vehicle, the braking action of each cylinder, when operating independently, will be improved retaining the car from being thrown into a side slip or skid.

A signal 33 operative in response to fluid pressures, is provided for each of the brake cylinders 16 and 17, for indicating when the respective cylinder is not effective for applying its respective wheel brakes. The constructional details of the signals 33 are most clearly illustrated in Fig. 4 from which it will be noted that each signal includes a switch means having a hollow casing 34 of separate sections 34a and 34b screw threaded together. Clamped between the adjacent edges of the casing sections 34a and 34b there is a flexible diaphragm 35 which divides the interior of the casing 24 into separate compartments 36 and 37.

The diaphragm is constructed of rubber or any other flexible dielectric material which is inert when contacted by the usual brake fluids used in brake systems of the type proposed by the present disclosure.

Mounted concentrically on the side of the diaphragm 35 facing into the compartment 37, there is a single contact plate 38 of a conductive metal. The contact plate 38 is secured to the diaphragm 35 by vulcanization or in any other manner. The other wall of the casing section 34b is formed with a concentric hole 39 into which a plug 40 is screwed. The plug 40 is formed of a dielectric material and has mounted on its inner face a pair of spaced contacts 41 arranged to be bridged by the contact plate 38 when the diaphragm is deformed toward the plug 40.

Pins 42 are extended from the contacts 41 completely through the plug 40. The outer ends of the pins 42 are threaded and have nuts 43 mounted thereon to have electric leads attached thereto, as will become clear as this specification proceeds. Positioned within the compartment 27 there is an expansion coil spring 44. The spring 44 operates between the adjacent faces of the diaphragm 35 and the outer wall of the casing section 34b to hold the diaphragm 35 in the natural unflexed position shown in Fig. 4 in which the contact plate 38 is spaced from the contacts 41. The outer wall of the casing section 34b, at opposite sides of the plug 40, is formed with vent openings 45 preventing the compartment 37 from becoming air locked.

Extending from the casing section 34a there is a concentric tube 46 which is threaded into the side of the respective cylinder 16 or 17 of the master cylinder unit 15.

The tubes 46 of the signals 33 are joined to the cylinders 16 and 17 at points reached by the pistons 20 when the supply of brake fluid within the cylinders would be considered dangerously low for safe operation of the brakes—a point at which operation of the brakes requires too much "pedal," as the condition is referred to by those skilled in the art. During normal operation of the brakes which causes a back pressure on the reserve fluid within the cylinders 16 and 17, some of that back pressure will expend itself through the tubes 46 into the compartments 36 of the signal casings 34. That pressure will flex the diaphragms 35 against the action of the springs 44 and engage the contact plates 38 with the contacts 41 and close the circuits to be here-in-after described.

Extended rearward from the side of each of the tubes 46, there is a by-pass tube 47 which is connected to the side of the respective cylinder 16 or 17 rearward of the point where the tube 46 is connected. Each by-pass tube 47 is constructed of two parts—one integral with the tube 46 and the other threaded into the respective cylinder 16 or 17—with the adjacent ends of the parts connected by a union 48. The spacing of the axial centers of the tubes 46 and 47 is equal to the thickness of the pistons 20, as best shown in Fig. 4. Thus, when the supply of brake fluid reaches the dangerously low point, continued forward movement of the pistons will close the entrance to the tubes 46 and expose the discharge ends of the by-pass tubes 47. When that position is reached fluid forced into the compartments 36 to flex the diaphragms 35 will be discharged by the action of the springs 44 on the diaphragms 35 to discharge back onto the cylinders 16 and 17 through the by-pass tube 47 to the back side of the pistons 20.

Therefore, even though the brake pedal is pushed completely inward, the contact plate 38 will not be contacted with the contacts 41 to operate the circuits to be described, indicaing that one or both of the cylinders is ineffective for operating its respective brakes. At this point, it should be explained that the springs 44 are pre-set to require a given pressure of the brake fluid against the diaphragms 35 to flex them against the action of the springs 44 to engage the contact plate 38 with the contacts 41. If a leak should develop in either of the brake systems so that insufficient back pressure develops within the cylinders 16 and 17 to flex the diaphragms, the plates 38 will not be contacted with the contacts 41.

Each of the signals 33 further includes a lamp 49 or 50 connected in series with the pins 42 of the contacts 41 so that the lamp 49 will be operated by the switch means of the right cylinder 16 and the lamp 50 will be operated by the switch means of the left cylinder 17. The circuits for each of the lamps 49 and 50 can be traced from the leads 51 and 52 extended from a source of current on the vehicle. The lead 51 has a branch lead 51a connected to one of the pins 42 of the switch mounted on the cylinder 16 and a lead 51b connected to one of the pins 42 of the switch mounted on the cylinder 16. The lead 52 has one branch 52a connected to one side of the lamp 49 and a second branch 52b connected to one side of the lamp 50. A lead 53 extends from the other pin 42 of the switch mounted on the cylinder 16 to the other side of the lamp 49. Likewise, a lead 54 extends from the other pin 42 of the switch mounted on the cylinder 17 to the other side of the lamp 50.

Referring to the scheamtic wiring diagram of Fig. 3, it will be noted that the circuits described provide a series for each of the lamps 49 and 50 causing them to be illuminated when the contact plate 38 of the respective cylinder switch is engaged with the respective contacts 41 closing the respective circuits. The lamps 49 and 50 are to be mounted within view of the operator of the vehicle on the dashboard so that illumination of the lamps can be plainly seen. When only one of the lamps 49 or 50 is illuminated, the operator will be immediately warned that something is wrong in the brake system controlled by the lamp which is not lit and that the vehicle is being operated with only partial braking. Accordingly, the vehicle should be operated more cautiously at reduced speeds until emergency repairs can be made restoring the four wheel brakes.

Referring to the modification of the invention shown in Figs. 5 to 7, the master brake unit 15a has separate brake cylinders 16a and 17a releasably joined together to be individually replaceable when required. Each of the cylinders 16a and 17a has its individual reservoir 18a with a separate fill hole closed by a separate removable screw plug 19a.

The inner side of the cylinder 17a is formed with a longitudinally extended rib 60, see particularly Fig. 6, formed with a longitudinally extended groove 61 of dove-tailed cross-section and which opens toward the cylinder 16a. The side of the cylinder 16a is formed with a longitudinally extended dove-tailed extension 62 which is slidably fitted into the groove 61 of the rib 60. Means is provided for holding the cylinders 16a and 17a against longitudinal movement relative to one another.

The holdnig means comprises a strip of metal 63 extended between the front ends of the cylinders 16a and 17a. One end of the strip of metal is secured to the cylinder 16a by a bolt 64 and the other end is secured to the cylinder 17a by a bolt 64.

The piston rods 22a which extend from the rear ends of the cylinders 16a and 17a are provided with right angularly bent portions 66 arranged in end alignment with the ends of the cross bar 23a carried by the extension 24. Axially slidable and turnably mounted on the ends of the cross bar 23a there are sleeves 67, see Figs. 5 and 7. The sleeves 67 are internally threaded at their ends facing the ends of the right angularly bent portions 66. The right angularly bent portions 66 of the piston rods 22a are similarly threaded to have the sleeves 67 threaded thereon. The sleeves 67 are arranged to be tightened against the inner faces of outwardly directed flanges 68 formed on the end portions 66. The flanges 68 function to limit threaded engagement with the end portions 66 to positions in which the lengths of the sleeves 67 are equally divided between the cross bar 23a and the end portions 66 to effect a rigid connection between those parts.

The constructions described in connection with Figs. 5 to 7 provide a convenient means whereby either of the cylinders 16a or 17a can be separated from the other to be replaced when necessary without having to replace the complete master cylinder unit 15a.

In all other respects, the form of the invention described in connection with Figs. 5 to 7 is similar to the first form and like reference numerals are used to identify like parts.

The features of the present invention have been described in connection with that type of brake system employing a liquid as its operating fluid. However, it is appreciated that those novel features of the present invention can also be incorporated in brake systems employing other types of operating fluid such as air or the like, without departing from the scope and intent of the present disclosure.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

An operating assembly for the wheel brakes of a motor vehicle, comprising a master cylinder unit having a pair of cylinders each having a piston, a separate brake fluid compartment communicating with each of said cylinders, pedal means for moving said pistons in unison, each cylinder having a hose connection to the brake of a front wheel on one side of the vehicle and to the brake of a rear wheel at the other side of the vehicle, and a signal for each of said cylinders indicating when the respective cylinder is not effective for applying its respective brakes, said signals comprising switch means responsive to brake fluids mounted on each of said cylinders, a lamp for each of said switch means, each switch means including spaced contacts arranged to be bridged by a contact plate movable by fluid pressure, and circuits connecting each of said lamps in series with the spaced contacts of one of said switch means and a source of current, each of said switch means being joined to its respective cylinder to receive fluid under pressure from said cylinders at a point reached by the respective piston when the supply of fluid is dangerously low in the respective cylinder, and a by-pass tube connecting each of said switch means to the respective cylinders at a point rearward of said first-mentioned point to relieve pressure to the switch means when the pistons move to the dangerously low position within said cylinders.

References Cited in the file of this patent

UNITED STATES PATENTS

| Number | Name | Date |
| --- | --- | --- |
| 2,107,111 | Etchison | Feb. 1, 1938 |
| 2,141,358 | Meeks | Dec. 27, 1938 |
| 2,332,301 | Cox | Oct. 19, 1943 |